Dec. 1, 1953   E. J. LABER   2,661,245
COMPRESSION GASKET HAVING MEANS FOR INDICATING
WHEN IMPROPERLY POSITIONED
Filed April 7, 1949
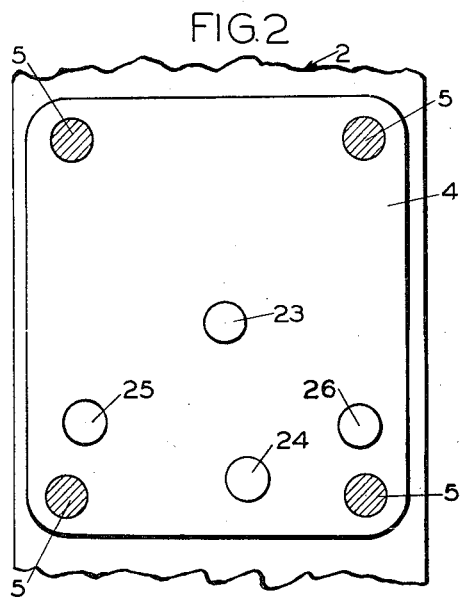
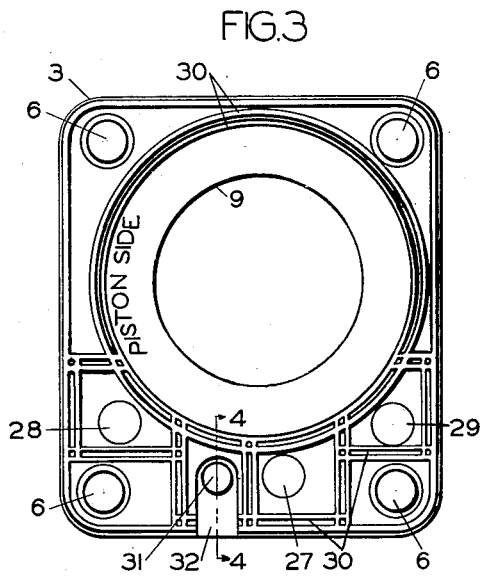
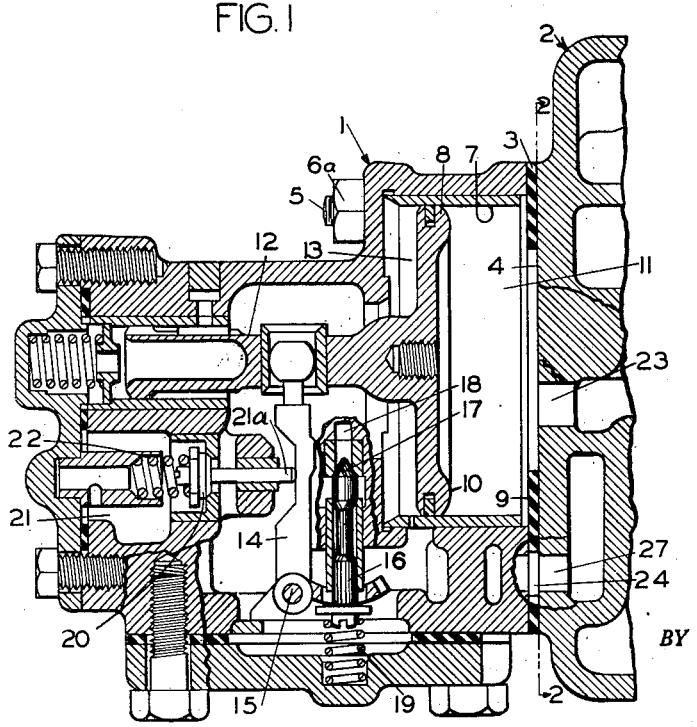
*INVENTOR.*
ERNEST J. LABER
BY
Frank E. Miller,
ATTORNEY Patented Dec. 1, 1953

2,661,245

UNITED STATES PATENT OFFICE 2,661,245

COMPRESSION GASKET HAVING MEANS FOR INDICATING WHEN IMPROPERLY POSITIONED

Ernest J. Laber, Irwin, Pa., assignor to Westinghouse Air Brake Company, a corporation of Pennsylvania Application April 7, 1949, Serial No. 85,973

3 Claims. (Cl. 303—1)

1

This invention relates to gaskets of the type employed between different parts of a device for preventing leakage of fluid under pressure between passages in said parts opening to the gasket or from said passages to atmosphere and the principal object of the invention is the provision of such a gasket having improved means to indicate when it is improperly applied to thereby minimize the possibility of improper application and failure of the device with which it is associated.

More particularly, automatic brake valve devices employed in connection with fluid pressure brake equipment for railways embody an equalizing discharge valve mechanism comprising an equalizing piston subject on one side to pressure of fluid in the usual brake pipe, and on the opposite side to pressure of fluid in the usual equalizing reservoir and said piston is operative upon a reduction in pressure in said equalizing reservoir to open a brake pipe discharge valve for venting fluid under pressure from the brake pipe to effect an application of brakes. In certain of these brake valve devices a brake pipe pressure maintaining valve device is also provided for operation by the equalizing piston in response to a reduction in pressure in the brake pipe relative to that in the equalizing reservoir, incident for example to leakage of fluid under pressure from the brake pipe, to supply fluid under pressure to the brake pipe to compensate for such leakage.

United States Patent 2,038,168 issued on April 21, 1936, to C. C. Farmer, discloses an automatic brake valve device such as above described wherein the equalizing discharge valve mechanism embodying an equalizing piston, brake pipe discharge valve and brake pipe maintaining valve are all contained in a casing section which is secured to the main body portion of the brake valve device with a gasket interposed therebetween. The gasket embodying the invention is, for the purpose of illustration, particularly adapted for use between the discharge valve mechanism and the main body portion of a brake valve device such as disclosed in the above mentioned Farmer patent.

In the accompanying drawing, Fig. 1 is a sectional view of a portion of an automatic brake valve device, an equalizing discharge valve mechanism and of an interposed gasket embodying the invention; Fig. 2 is a sectional view taken on the line 2—2 in Fig. 1; Fig. 3 is plan view of one sealing face of the improved gasket; and Fig. 4 is a sectional view taken on the line 4—4 in Fig. 3.

2

*Description*

As shown in the drawing, the reference numeral 1 designates an equalizing discharge valve mechanism, the numeral 2 designates a portion of a brake valve device or the like to which said mechanism is adapted to be secured, and numeral 3 designates a gasket, embodying the invention, clamped between said portion and mechanism.

The portion 2 of the brake valve device shown in the drawing has a substantially rectangular flat gasket surface 4 from adjacent the four corners of which projects four symmetrically arranged mounting studs 5. The gasket 3 is similarly shaped and has adjacent its corners symmetrically arranged openings 6 through which the studs 5 project for supporting the gasket on said studs with one face of the gasket in contact with the flat surface 4. The equalizing discharge valve mechanism 1 comprises a casing mounted against the opposite face of gasket 3 with the studs 5 extending through bores (not shown) in said casing and with a nut 6a on the free end of each stud engaging said casing for clamping it, the brake valve portion 2 and the interposed gasket 3 in air tight relation with each other. While not shown in the drawing and not pertinent to the invention, certain of the studs 5 and the bores in the casing of the equalizing discharge valve mechanism 1 are shorter than others, to ensure that said mechanism will be properly mounted on the brake valve portion 2.

The casing of the discharge valve mechanism 1 has a bore 7 open at the end of the casing abutting the gasket 3 and an equalizing piston 8 is slidably mounted in this bore. The gasket 3 has a through bore of smaller diameter than and concentric with bore 7 to provide an annular piston sealing portion 9 which is exposed at one end of the casing bore 7 for sealing engagement by an annular rib 10 provided on the adjacent face of piston 8. Between the piston 8 and gasket 3 is an equalizing reservoir chamber 11. The piston 8 has a stem 12 projecting from its opposite face through brake pipe chamber 13 and suitably supported in the casing at its end, and connected to said stem for movement therewith is one end of a bell crank 14 which at its knee is fulcrumed on a pin 15. The other arm of the bell crank 14 is operatively connected to one end of a stem 16 which is slidably mounted in the casing, the opposite end of said stem constituting a brake pipe discharge valve 17 arranged to be opened by said arm to establish communication between chamber 13 and a passage 18. A spring 19 acting on stem 16 is provided for closing valve 17.

At one side of the bell crank arm connected to the piston stem 12 is a brake pipe pressure maintaining valve 20 contained in a fluid pressure supply chamber 21 and having a stem 21a extending into chamber 13 for operation by said arm to unseat said valve for establishing communication between said chambers. A spring 22 contained in chamber 21 acts on the valve 20 for seating it.

The equalizing reservoir piston chamber 11 is open through the bore encircled by the piston sealing portion 9 of gasket 3 to the end of an equalizing reservoir passage 23 in the brake valve portion 2. The brake pipe chamber 13, discharge valve passage 18 and maintaining valve chamber 21 are adapted to be connected through passages in the casing of the equalizing discharge valve mechanism 1 to aligned passages 24, 25 and 26 (Fig. 2) in the brake valve portion 1 by way of registering ports 27, 28 and 29, respectively, through the gasket 3. The above mentioned passages in the casing of the discharge valve mechanism 1 do not appear in the section of said mechanism shown in Fig. 1 but they extend to the face thereof engaging gasket 3 for registering with the respective ports in said gasket, but the drawing is believed to be adequate in this connection for a clear understanding of the invention, particularly in view of the Farmer patent hereinbefore referred to which fully discloses all of this structure diagrammatically.

On the face of gasket 3 adjacent the casing of the discharge valve mechanism 1, raised sealing ribs 30 are provided around each of the above mentioned openings through said gasket for engagement with and compression by the engaging face of said casing to prevent leakage of fluid under pressure between said openings or from said openings to atmosphere.

In the portion 2 of the brake valve device the passage 24 constitutes a brake pipe passage normally charged with fluid under pressure, the passage 25 is an exhaust passage adapted to lead to atmosphere, the passage 26 is a fluid pressure supply passage, and passage 23 is an equalizing reservoir passage also normally charged with fluid under pressure. With the gasket 3 properly applied to the portion 2 of the brake valve device, that is, with ports 27, 28 and 29 therethrough in registry with passages 24, 25 and 26, and with the equalizing discharge valve mechanism 1 also assembled to said portion of the brake valve device, the equalizing reservoir chamber 11 and brake pipe chamber 13 at opposite sides of the equalizing piston 8 will be open to passages 23 and 24, respectively, in the brake valve device, likewise the fluid pressure supply chamber 21 containing the maintaining valve 20 will be open to passage 26 in the brake valve device, while the brake pipe discharge valve exhaust passage 18 will be open to the exhaust passage 25 in the brake valve device.

Now assume that the equalizing discharge valve mechanism 1 and gasket 3 are properly assembled on the brake valve device 2. When the brake valve device is operated to charge a fluid pressure system with which it is associated, fluid under pressure will be supplied through passages 23, 24 and 26 in said device to, respectively, the equalizing piston chamber 11, the brake pipe chamber 13 and the fluid pressure supply chamber 21. Subsequently when the brake valve device is operated to effect an application of brakes, pressure of fluid in the equalizing piston chamber 11 will be reduced by way of passage 23 in the brake valve device to cause operation of the equalizing piston 8 to open the discharge valve 17 for venting fluid under pressure from the usual brake pipe by way of the brake valve passage 24, port 27 in gasket 3 and the brake pipe chamber 13 to the passage 18 and thence to atmosphere through port 28 in said gasket and registering passage 25 in the brake valve device. If at any time the pressure of fluid in the brake pipe acting in chamber 13 on one side of the equalizing piston should become reduced sufficiently below the equalizing reservoir pressure effective in chamber 11 on the opposite side of said piston, said piston will operate to open the maintaining valve 20 for supplying fluid under pressure to the brake pipe via passage 26 in the brake valve device, port 29 in gasket 3, chamber 21 in the discharge valve mechanism 1, brake pipe chamber 13 and thence through port 27 in the gasket 3 and passage 24 in the brake valve device.

It will be obvious that the gasket 3 must be properly applied to the studs 5 in order that the brake valve device will properly function as above mentioned. By observing Figs. 2 and 3 showing, respectively, the gasket face 4 on the brake valve device 2 and the face of gasket 3 adapted to engage the equalizing discharge valve mechanism 1, it will be seen that the gasket may be either properly mounted on studs 5 with the gasket ports 27, 28 and 29 registering with the brake valve passages 24, 25 and 26, respectively, as intended, or the gasket may be either turned over end for end or from one side to the other and improperly mounted on said studs. If the gasket is turned over end for end and mounted on the studs 5 the opening through the gasket encircled by the piston engaging portion 9 will register with the brake pipe passage 24 and connect same to the equalizing reservoir passage 23, while if the gasket were turned over side for side and mounted on said studs the brake pipe passage 24 in the brake valve device would be closed by the gasket, as so far described, and in both cases prevent functioning of the brake valve device to control brakes.

When the gasket 3 was initially designed it was thought that since the passages 24, 25 and 26 in the brake valve device 2 were all at one side of the passage 23 and adjacent one end of the mounting face 4 on the brake valve device, and the ports 27, 28 and 29 were similarly located adjacent one end of the gasket no difficulty would ever arise from improperly applying the gasket to studs 5 by turning it over end for end in which case said ports would be disposed at the wrong side of passage 23 in the brake valve device. Anticipating however that the gasket might be turned over from side to side for application to the studs 5, the legend "Piston Side" in raised letters was provided on the piston sealing portion 7 of the gasket to indicate that this side of the gasket should be facing the equalizing piston 8.

In spite of the above precautions failures of the brake valve device 2 to function have occurred due to improper application of the gasket 3 on the mounting studs 5. In order to eliminate these difficulties, I have modified the gasket in such a manner that unless it is properly applied to the studs 5 a severe blow of air will occur upon supply of fluid under pressure to the passages 23, 24 in the brake valve device in testing said device subsequent to cleaning or repairing so as to promptly bring the improper application to the attention of the workman so that it may be corrected.

According to the invention I provide another port 31 in the gasket extending from one sealing face of the gasket to the other and a port or slot 32 in said other face which connects said port to the outer edge of the gasket. As viewed in the drawing this port 31 and port 27 are arranged at opposite sides of the vertical center line of the gasket and substantially the same distance therefrom and from the bottom edge of the gasket so that if said gasket is properly applied the port 31 and slot 32 serve no purpose. If however the gasket is turned over end for end from its normal relation to the brake valve face 4 shown in the drawing and then mounted on the studs 5, the port 31 and slot 32 will open the equalizing reservoir chamber 11 to atmosphere. If the gasket is thus turned over end for end and then from side to side the same result will be obtained via slot 32. In case the gasket is merely turned over from side to side from its normal relation to the brake valve face 4, then the slot 32 will register with the brake pipe passage 24. Thus if the gasket is improperly applied to the studs, initial supply of fluid under pressure to the brake valve device for testing purposes will result in a severe blow of air either from the equalizing reservoir passage 23 or brake pipe passage 24 to atmosphere which will call the workman's attention to the improper application and ensure changing the gasket around until the blow of air is eliminated at which time the gasket will be properly applied, in spite of the workman.

Having now described the invention what I claim as new and desire to secure by Letters Patent, is:

1. An element adapted to be clamped between two devices and having two oppositely arranged faces for matching, respectively, with faces on said devices, said element comprising two fluid conducting ports substantially equally spaced from opposite sides of an axis of said element and from one edge of said element, one of said ports extending only between said opposite faces of said element, and the other port communicating with an opening which opens to an exterior edge of said element.

2. An element adapted to be mounted and clamped between two devices one having a fluid conducting port at one side of an axis of the device adapted to communicate with an aligned port in the other device, said element comprising, in combination with said two devices, two symmetrically arranged openings one or the other of which is adapted to register with the said port in one of said devices according to whether said element is properly mounted between said devices or reversed and thereby improperly mounted between said devices, one of said openings extending between opposite faces of said element for opening the port in one device to the port in the other device when the element is properly disposed between the two devices, and means in said element connecting the other opening to an exterior edge of the element and thereby atmosphere for venting one of said ports when said element is improperly mounted between said devices.

3. In combination, two devices one having a fluid conducting port at one side of an axis of the device adapted to communicate with an aligned port in the other device, an element adapted to be mounted and clamped between said devices, said element having two openings symmetrically arranged at opposite sides of said axis, one or the other of which openings is adapted to register with the said port in one of said devices according to whether said element is properly mounted between said devices or reversed and thereby improperly mounted between said devices, one of said openings extending between opposite faces of said element for opening the port in one device to the port in the other device when the element is properly disposed between the two devices, said element also having a third opening connecting the other of said two openings to an exterior edge of said element for venting one of said ports when said element is improperly mounted between said devices.

ERNEST J. LABER.

References Cited in the file of this patent

UNITED STATES PATENTS

| Number | Name | Date |
|---|---|---|
| 1,782,567 | Farmer | Nov. 25, 1930 |
| 1,839,336 | Oven | Jan. 5, 1932 |
| 2,232,883 | Neveu | Feb. 25, 1941 |
| 2,363,584 | Good | Nov. 28, 1944 |